(12) United States Patent
Pino et al.

(10) Patent No.: US 9,723,075 B2
(45) Date of Patent: Aug. 1, 2017

(54) SYSTEMS AND METHODS FOR DATA SYNCHRONIZATION MANAGEMENT BETWEEN CALL CENTERS AND CRM SYSTEMS

(71) Applicant: inContact, Inc., Salt Lake City, UT (US)

(72) Inventors: Bryan Pino, Riverton, UT (US); Derick Walburger, South Jordan, UT (US); Kacie Mayberry, Sandy, UT (US); Chris Seaman, South Jordan, UT (US); Rix Ryskamp, Mapleton, UT (US)

(73) Assignee: INCONTACT, INC., Salt Lake City, UT (US)

( * ) Notice: Subject to any disclaimer, the term of this patent is extended or adjusted under 35 U.S.C. 154(b) by 193 days.

(21) Appl. No.: 14/485,499

(22) Filed: Sep. 12, 2014

(65) Prior Publication Data

US 2015/0081841 A1    Mar. 19, 2015

Related U.S. Application Data

(60) Provisional application No. 61/877,815, filed on Sep. 13, 2013.

(51) Int. Cl.
*H04L 29/08* (2006.01)

(52) U.S. Cl.
CPC .......... *H04L 67/1095* (2013.01); *H04L 67/06* (2013.01)

(58) Field of Classification Search
CPC .................................................. H04L 67/1095
See application file for complete search history.

(56) References Cited

U.S. PATENT DOCUMENTS

| | | | | |
|---|---|---|---|---|
| 6,295,551 B1 * | 9/2001 | Roberts | ............... | G06F 9/44526 709/203 |
| 7,020,545 B2 * | 3/2006 | Kamdar | ................ | G07C 5/008 455/574 |
| 7,496,183 B1 * | 2/2009 | Rodkey | ............... | H04L 12/1895 379/88.12 |
| 7,739,325 B1 * | 6/2010 | Okita | ...................... | H04M 3/51 709/200 |
| 8,160,904 B1 * | 4/2012 | Smith | .................... | G06Q 10/10 705/4 |
| 8,165,274 B1 * | 4/2012 | Rodkey | ............... | H04L 12/1895 340/332 |
| 8,577,895 B2 * | 11/2013 | Gupta | .................... | G06Q 10/10 707/748 |

(Continued)

*Primary Examiner* — Backhean Tiv
(74) *Attorney, Agent, or Firm* — Pearl Cohen Zedek Latzer Baratz LLP

(57) ABSTRACT

Systems and methods for synchronizing data between a communications management system and data management system. In some implementations, contact data may be requested from a data management system external to and/or operated by a distinct entity with respect to a communications management system. The requested contact data may be received at the communications management system and the communications management system may be used to establish a communication using at least one contact from the requested contact data. The requested contact data may be updated using data generated during the communication and then updated contact data may be transmitted to the data management system to synchronize the two systems.

20 Claims, 4 Drawing Sheets

(56) References Cited

U.S. PATENT DOCUMENTS

| | | | | |
|---|---|---|---|---|
| 8,787,546 | B2* | 7/2014 | Ryskamp | H04M 3/2281 379/201.1 |
| 9,106,724 | B1* | 8/2015 | Harris | H04L 51/16 |
| 9,661,149 | B2* | 5/2017 | Minert | H04M 11/06 |
| 2003/0117434 | A1* | 6/2003 | Hugh | G06F 17/3056 715/744 |
| 2004/0039779 | A1* | 2/2004 | Amstrong | G06Q 10/10 709/204 |
| 2004/0039846 | A1* | 2/2004 | Goss | H04L 29/06 709/248 |
| 2004/0141508 | A1* | 7/2004 | Schoeneberger | H04L 41/5064 370/401 |
| 2005/0027802 | A1* | 2/2005 | Madsen | G06Q 10/06 709/204 |
| 2005/0235000 | A1* | 10/2005 | Keil | H04L 29/12283 |
| 2007/0038499 | A1* | 2/2007 | Margulies | G06Q 10/06 705/7.26 |
| 2007/0208878 | A1* | 9/2007 | Barnes-Leon | G06Q 10/00 709/246 |
| 2009/0310774 | A1* | 12/2009 | Hendricks | H04M 3/5183 379/265.13 |
| 2011/0022632 | A1* | 1/2011 | Kishimoto | H04L 61/2015 707/770 |
| 2011/0153378 | A1* | 6/2011 | Costello | G06Q 10/06 705/7.12 |
| 2013/0030854 | A1* | 1/2013 | McCormack | H04L 51/28 705/7.14 |
| 2013/0097691 | A1* | 4/2013 | Tanji | H04L 63/0236 726/13 |
| 2014/0040162 | A1* | 2/2014 | McConnell | G06F 17/30312 705/347 |
| 2014/0082075 | A1* | 3/2014 | Fullea Carrera | H04L 65/403 709/204 |
| 2015/0081841 | A1* | 3/2015 | Pino | H04L 67/1095 709/217 |

* cited by examiner

SYSTEMS AND METHODS FOR DATA SYNCHRONIZATION MANAGEMENT BETWEEN CALL CENTERS AND CRM SYSTEMS

RELATED APPLICATIONS

This application claims the benefit under 35 U.S.C. §119(e) of U.S. Provisional Patent Application No. 61/877,815 filed Sep. 13, 2013 and titled "SYSTEMS AND METHODS FOR DATA SYNCHRONIZATION MANAGEMENT," which application is incorporated herein by reference in its entirety.

SUMMARY

Disclosed herein are embodiments of systems and methods synchronizing data and/or managing communications between a communications management system and an external data management system, such as a customer relationship management system. In one particular example of a method according to an implementation of the invention, the method may comprise requesting contact data from a customer relationship management system. The contact data may be filtered to obtain a filtered set of contact data. The filtered set of contact data may be sent to, or received at, a communications management system, such as a call center.

In some implementations, the communications management system may be external to the customer relationship management system and/or operated by an entity distinct from an entity operating the customer relationship management system. Thus, two disparate systems may be synchronized in an improved manner to improve efficiency and increase freshness of customer contact records.

The communications management system may be used to establish a communication session using at least one contact from the filtered set of contact data, after or during which data may be automatically synchronized between the communications management system and the customer relationship management system using data generated during the communication session.

In some implementations, the step of using the communications management system to establish a communication session may comprise using a call center dialer system to dial a telephone call to one or more contacts from the filtered set of contact data.

Some implementations may further comprise establishing one or more triggers for automatically requesting contact data from the customer relationship management system. In some such methods, the one or more triggers may comprise at least one threshold, such as, for example, a lower threshold of currently available contact records. The currently available contact records may be generated by filtering the contact records according to time information in the contact records and a current time. For example, in some implementations, contact records containing an indication that a current time or time frame is not convenient for a particular contact/customer may be filtered out before a set of contact records are sent to the communications management system.

Some implementations may further comprise comparing a parameter of a set of contact records with the one or more triggers. For example, the step of comparing a parameter of a set of contact records with the one or more triggers may comprise comparing a number of contacts in a set of contact records at the communications management system with a threshold number of contact records. The threshold number of contact records may comprise, for example, a lower threshold of currently available contact records. The currently available contact records may comprise contact records filtered according to time information in the contact records and a current time. The time information may comprise at least one of a preferred contact time frame and a time frame during which a previous communication was successful.

Some implementations may further comprise creating a data synchronization and communication workflow using a workflow creation user interface, and may further comprise using the data synchronization and communication workflow to manage one or more communication sessions with one or more contacts from the filtered set of contact data. The data synchronization and communication workflow may also, or alternatively, be used to manage synchronization of data between the communications management system and the customer relationship management system.

In another example of a method according to another implementation for synchronizing data between a communications management system and a data management system, the method may comprise requesting contact data from the data management system and receiving requested contact data at a communications management system. The communications management system may be external to the data management system. The communications management system may be used to establish a communication session using at least one contact from the requested contact data. The requested contact data may be updated during and/or after the communication session(s) using data generated during the communication session, and updated contact data may be sent to the data management system.

Some implementations may further comprise filtering the contact data to obtain a filtered set of contact data. The step of receiving requested contact data at the communications management system may therefore comprise receiving the filtered set of contact data from the data management system.

In a particular example of an embodiment of a communications management and data synchronization system for managing communications and synchronizing communications data between a communications management system and an external customer relationship management system, the system may comprise a workflow creation user interface configured to allow a user to customize a workflow associated with communications between one or more agents and one or more contacts. The workflow creation user interface may further be configured to allow a user to control the flow of communications data comprising data associated with communication between one or more agents and one or more contacts.

The system may further comprise a communications system datastore configured to store internal communications data comprising data associated with communication between one or more agents and one or more contacts generated by the communications management and data synchronization system. An execution module may also be provided, which may be configured to receive external communications data from a customer relationship management system external to the communications management and data synchronization system. The execution module may further be configured to receive internal communications data from a communications system datastore, and may be further configured to synchronize communications data between the communications management and data synchronization system and the external customer relationship management system.

In some implementations, the execution module may further be configured to execute synchronization of communications data between the communications management and data synchronization system and the external customer relationship management system based upon instructions contained in metadata. The workflow creation user interface may be configured to use user interface abstractions comprising graphical representations, such as icons, to create a synchronization workflow instruction set and encapsulate the synchronization workflow instruction set in the metadata.

The workflow creation user interface may also be configured to allow the graphical representations to be manipulated, such as at least one of dragged and dropped, stretched, and connected with flow process lines, to abstract the synchronization workflow instruction set.

The communications data may comprise data automatically generated by the communications management and data synchronization system during communications with contacts and/or may comprise data manually entered by an agent of the communications management and data synchronization system.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1:
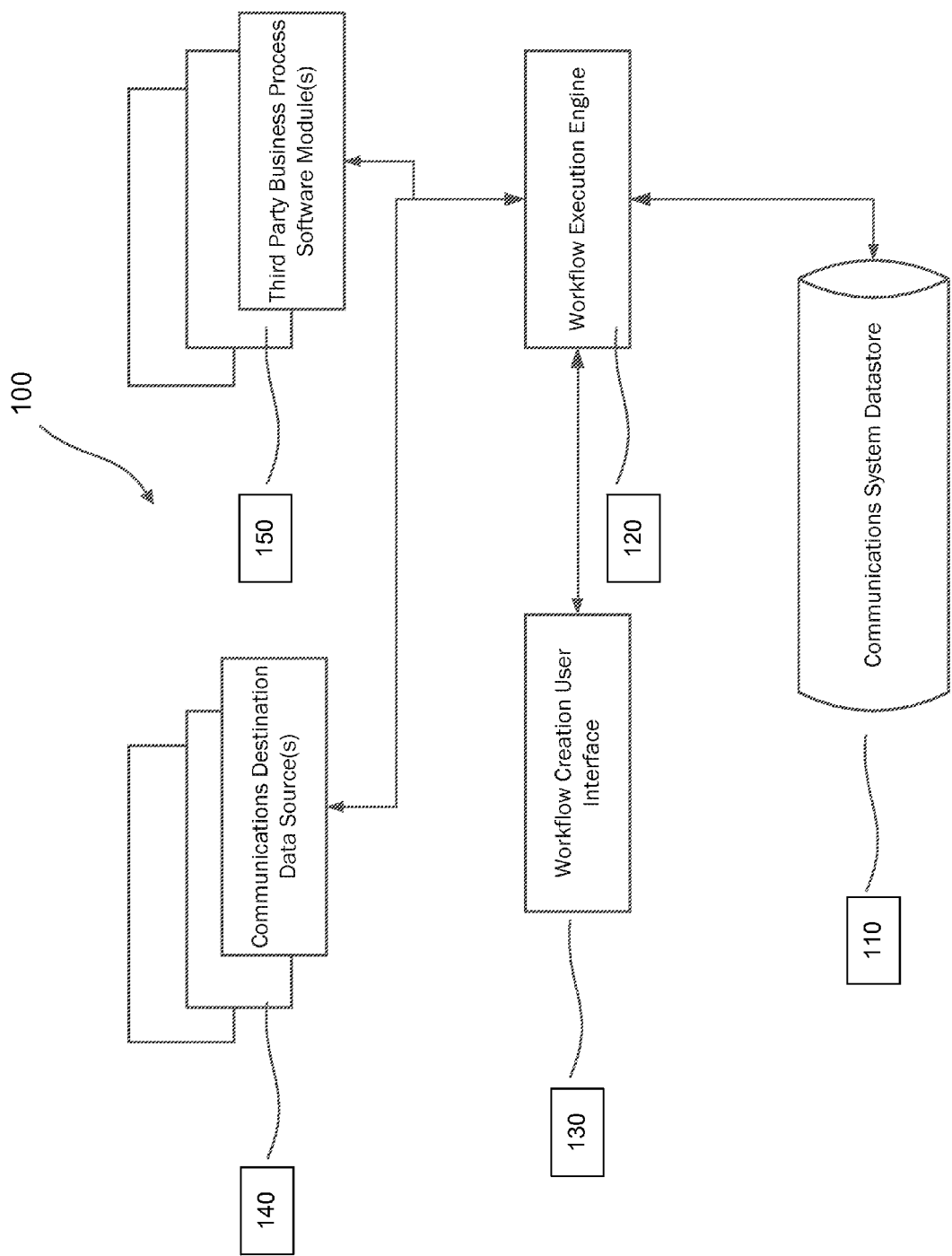
FIG. 1 depicts an example of a system for synchronizing communications data according to one embodiment.

A detailed description of systems and methods consistent with various embodiments of the present disclosure is provided below. It will be readily understood that the components of the present disclosure, as generally described and illustrated in the drawings herein, could be arranged and designed in a wide variety of different configurations. Thus, the following more detailed description of the embodiments of the apparatus is not intended to limit the scope of the disclosure, but is merely representative of possible embodiments of the disclosure. In addition, while numerous specific details are set forth in the following description in order to provide a thorough understanding of the embodiments disclosed herein, some embodiments can be practiced without some or all of these details. Moreover, for the purpose of clarity, certain technical materials, structures, or operations that are known in the related art have not been shown or described in detail in order to avoid unnecessarily obscuring the disclosure.

Various embodiments of systems and methods are disclosed herein that relate to synchronization of data. For example, some embodiments and implementations may be particularly useful in connection with synchronization of data within a first communications system of, for example, a call center, with data from another disparate data system that may be external to the first communications system. In some embodiments and implementations, this synchronization may be accomplished by abstracting the complexities of the data synchronization to simplify such synchronization and/or recordation of data. This may be accomplished, for example, by providing a point and click user interface that enables users to synchronize data between disparate systems in an intuitive and user-friendly manner.

To provide one specific example of an application that may find the inventive principles and concepts disclosed herein particularly useful, call centers often rely on customer relationship management (CRM) systems to organize contacts and interactions with current and prospective customers. However, most call centers also use other systems to manage internal operations and/or other data flows. For example, call centers often use software to manage the flow of incoming calls from customers and/or outbound calls to customers or potential customers.

However, it can be very time-consuming and burdensome to synchronize data between a CRM system and a call management system. Indeed, such synchronization is typically accomplished by manually exporting communication data—such as contact information—from the call management system, into a spreadsheet and then importing such data into the CRM system. Contact information may comprise any number of pieces of information relating to contacting a customer and/or potential customer, including but not limited to phone numbers, email addresses, uniform resource identifiers, mailing addresses, tweeting handles, social media contact handles, session initiation protocol ("SIP") endpoint information, and the like. In some embodiments, related communication data that may be useful for communicating with a contact may also be provided. Such communication data may comprise for example, first name, last name, priority data indicative of the urgency with which future communications with the contact should be made, value information indicative of the perceived value of the particular contact/customer to a business, customer history information, such as the number, times, and/or methods by which a contact has been contacted, and the like.

This manual synchronization of communication data often must be done daily, or at least continuously, in order to ensure that data records in the CRM system are current. Similarly, data from the CRM system may need to be exported and then imported into the call management system in order to maintain up-to-date synchronization of data. This may be critical in order to, for example, allow call center agents to make most efficient uses of their time in making and/or receiving telephone calls and avoid causing customer relation problems.

Certain embodiments and implementations of the invention disclosed herein may therefore be used to simplify and/or automate data synchronization between disparate systems, such as communications management systems in a call center, for example. Some embodiments may be configured to allow for integration with any CRM, including in-house built CRMs and other popular CRMs.

In some embodiments, this data synchronization may be accomplished by "checking out" records from a CRM or another external, disparate system. These records may then be used, such as during a communication session with a customer or potential customer, for example, and subsequently updated based on the outcome/result of the communication. The record may then be "checked in" in an updated format to the CRM/disparate system. Such embodiments may thereby eliminate, or at least reduce, the need for manual updating/integration between such systems and/or may eliminate the need for expensive, customized integration/synchronization development between such systems. Some embodiments may also allow for customization of this integration of their software with a CRM or other third-party system, as described below.

Additional details regarding certain preferred embodiments and implementations will now be described in greater detail with reference to the accompanying drawings. FIG. 1 depicts a schematic diagram of an example of a data synchronization system 100 according to one embodiment. Data synchronization system 100 comprises a communications system datastore 110, a workflow execution engine 120, a workflow creation user interface 130, one or more communications destination data sources 140, and one or more third party business process software modules 150.

The workflow creation user interface 130 may be used to customize a workflow associated with a communication management system, such as a call center dialer, and may further be used to control the flow of communications data between systems, such as flow from one or more communications destination data sources 140 and a communications system datastore 110. The workflow creation user interface 130 may, in some embodiments, be configured to abstract the management of data between systems to allow user-friendly and simple actions to result in complicated data synchronization actions that would otherwise require customized and complicated programming scripts.

For example, in some embodiments, a user may be able to simply drag and drop, connect, click, or otherwise manipulate icons in intuitive ways to create one or more steps in a data synchronization workflow. For example, in a call center environment, a user may be able to create an automated step in a data synchronization workflow that, upon receipt of an incoming call and/or initiation of an outbound call, automatically creates an icon and an accompanying data item comprising all contact information and/or other communication data, if available, regarding the person and/or entity associated with the call. The user may be able to drag and drop this icon into another icon or other graphical representation associated with an external system, such as a CRM system. This may indicate to the system that, upon receipt of an incoming call and/or initiation of an outbound call, all desired data, such as any of the communication data and/or customer information referenced above, should automatically be transferred to the CRM. In some embodiments, the system may further be configured to continue the transfer of new data, either as it is acquired or at a later specified time, to the CRM or other disparate system.

Some embodiments may further, or alternatively, be configured to automate transfer/synchronization of data in a predetermined manner according to certain criteria. For example, workflow creation user interface 130 may be used to specify that certain communication data from an external system, such as a CRM system, may be associated with a particular project and/or workgroup within an internal communication system according to one or more criteria and/or actions associated with a call and/or contact. For example, workflow creation user interface 130 may be used to specify that incoming data comprising contact information that is flagged as high value should be synchronized with a particular project and/or workgroup by dragging and dropping an icon or other graphical representation of that value level into another icon or other graphical representation of the desired project and/or workgroup.

As another example, workflow creation user interface 130 may be used to associate a particular flow of data be triggered upon detection of a particular criteria associated with a call or series of calls. For example, workflow creation user interface 130 may be used to create a workflow that, upon detecting a threshold number of unsuccessful call attempts, moves contact information from one project and/or workgroup to another project and/or workgroup within third party business process software module(s) 150 to indicate a decrease in the value level of the contact. Similarly, in some embodiments, workflow creation user interface 130 may be used to create a workflow that, upon detecting (which may comprise receiving an indication from a user) an indication of interest in a product from a user, moves contact information from one project and/or workgroup to another project and/or workgroup within third party business process software module(s) 150 to indicate an increase in the value level of the contact.

In some embodiments, the workflow generated by the workflow creation user interface 130 may be used to provide real-time data to the CRM or another similar, external data management system. Thus, for example, various scripts/events may be generated in the workflow creation user interface 130 that may serve to trigger the transfer of information back to a CRM. For example, the workflow may dictate the transfer of a notification at or just prior to the initiation of a telephone call or other communication. Other such notifications may alternatively, or additionally, be generated once a call/communication is connected, after the call/communication disconnects, and/or after control of the contact record has been released back to the CRM (e.g., once the recorded has be "checked in").

In this manner, a CRM or other such system may be able to have real time information, such as information about which records are checked out, that may be used to "mimic" the status information that a dialer or communications system might have. This may prevent conflicts between the CRM/data management system and the call center/communications system by allowing only one of the two systems to access a particular data record at a time. This may also allow a CRM to obtain real time information regarding, for example, the status of each data record, receive immediate updates regarding communication status and results, etc.

Figure 2:
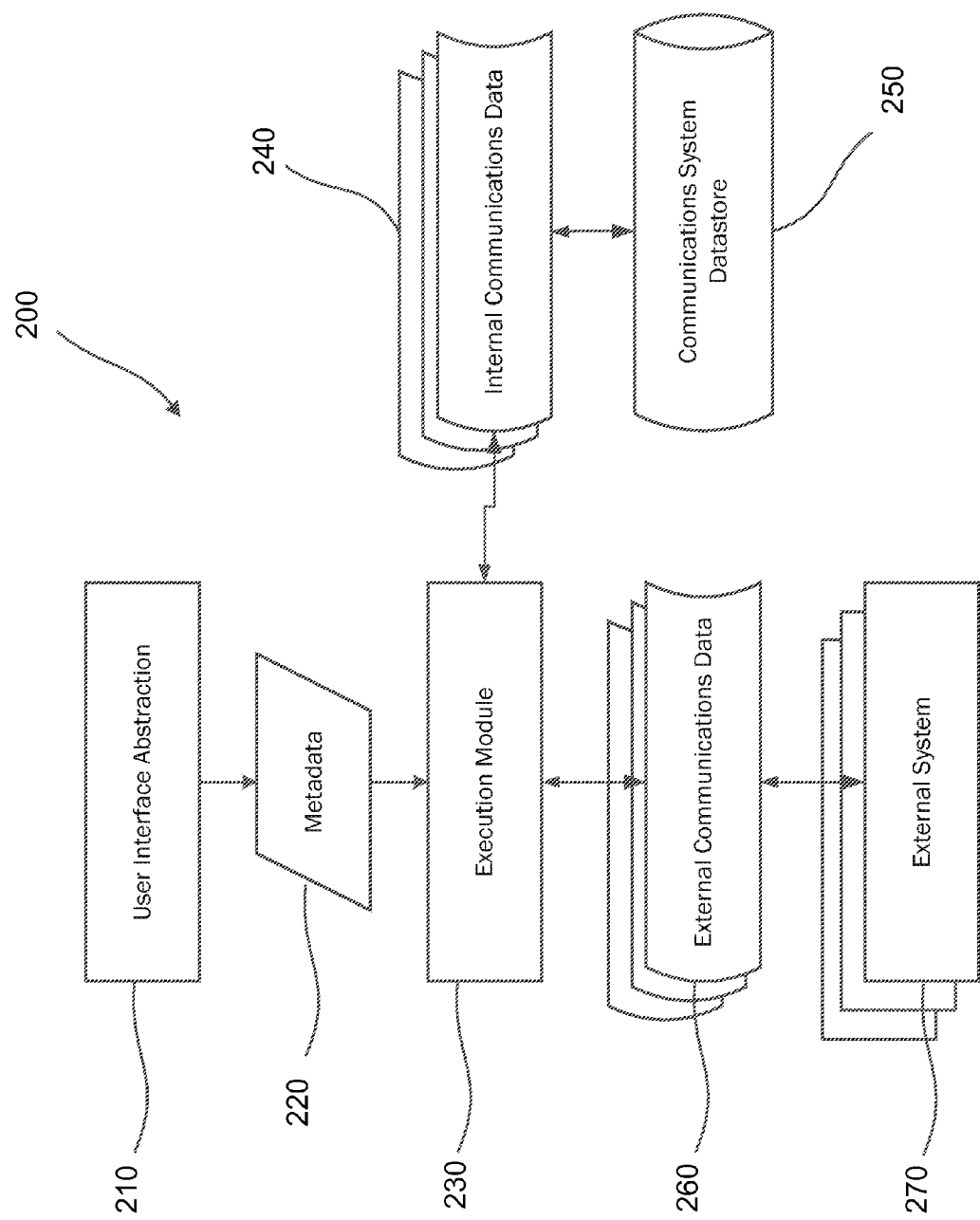
FIG. 2 depicts the data flow within a system for synchronizing communications data according to another embodiment.

In some embodiments, the workflow designed in the user interface 130 of data synchronization system 100 may be sent to the workflow execution engine 120 via metadata. For example, FIG. 2 depicts an example of a system 200 for data synchronization that comprises metadata 220 that may be used to provide instructions for execution by another component of the system, such as execution module 230.

System 200 further comprises a user interface abstraction 210, which may comprise an abstraction of a part of a dataflow process, such as a process for synchronizing contact information and/or other communication data in a communication system, such as a call center communications system. User interface abstraction 210, or one or more features, aspects, or elements of user interface abstraction 210, may comprise a workflow creation user interface, such as workflow creation user interface 130 of data synchronization system 100.

As mentioned above, metadata 220 may be used to provide instructions that may be executed by execution module 230. Execution module 230 may comprise an execution module for one or more parts of a dataflow process, such as a data synchronization process.

Execution module 230 may, in some embodiments, be configured to send and/or receive internal communications data 240 to and/or from a communications system datastore 250. For example, in some embodiments, contact information—such as, for example, phone numbers, email addresses, uniform resource identifiers, mailing addresses, tweeting handles, social media contact handles, SIP endpoint information, etc.—may be received from communications system datastore 250 and sent to one or more external systems 270 through execution module 230.

Similarly, execution module 230 may, in some embodiments, be configured to send and/or receive external communications data 260 to and/or from one or more external systems 270. Thus, for example, in some embodiments, execution module 230 may be configured to execute the flow of communications data between internal and external systems (such as communications system datastore 250 and external system(s) 270), as may be specified by a user in workflow creation user interface 130.

In some embodiments, the flow of data between internal and external systems may be automated. In some embodiments, this automation may be specified by one or more users. For example, one or more portions of the automated data synchronization workflow may be dictated by a user, such as an administrator of a call center communications system or other communications system, by using the workflow creation user interface 130 and workflow execution engine 120 of FIG. 1. Alternatively, or additionally, one or more portions of the automated data synchronization workflow may be dictated by another type of user, such as an agent of a call center, for example.

To provide a more specific example of automated data synchronization structured by a workflow creation user interface 130 and/or a user interface abstraction 210, in some embodiments a user—such as an administrator of a call center communications system—may create an automated workflow by dragging and dropping icons representative of contact information and/or other communications data to and from other icons. For example, system 200 may be configured to allow for dragging an icon associated with a particular perceived value of an incoming call to an icon associated with a workgroup, project, campaign, or the like. Such manipulation of icons may cause execution module 230 to automatically transfer contact information in internal communications data 240 for an incoming call to the desired workgroup, project, campaign, or the like, within external system 270 upon receiving an indication that the person/entity call has been identified as being classified in the particular value class.

Some embodiments may be configured to allow for structuring a data synchronization workflow with arrows, lines, or other connectors that visually indicate or suggest a flow of contact information or other communications data between internal and external systems. For example, the user interface abstraction 210 may be configured to allow a user to drag, connect, or otherwise insert an arrow from one icon representative of an external system to another icon representative of an internal system to indicate that contact information or other communications data should be transferred from one system to another. Such icons may be used to represent, for example, a particular action, a particular data source or data set, a particular campaign/project, a particular call, a particular subset of contact information or other communications data, or a particular system.

Thus, in some embodiments, dragging an action icon onto a data set icon may result in performing that particular action on that particular data set. For example, dragging a "synchronize" icon onto a particular campaign data set icon associated with an external system may result in a transfer of data associated with that campaign to/or from the external system.

Other aspects of the user interface abstraction 210 may be used to dictate other parameters or characteristics of the data transfer. For example, in some embodiments, icons may be stacked upon one another either before or after connecting icons together with connectors. For example, an icon representative of one particular project/campaign may be dragged onto another icon representative of another project/campaign and then an arrow or other connector icon may be connected with an icon representative of an external system to indicate that all contacts from both projects/campaigns should be synchronized or transferred to the external system. Alternatively, such synchronization may be accomplished by separately connecting both icons to the external system icon.

Other aspects of the execution of synchronization system 200 may be configured to allow for manual transfer of communications data between communications system datastore 250 and external system 270 by another user, such as an agent of a call center. For example, user interface abstraction 210 may be configured to allow such a user to drag and drop various icons, or otherwise use abstracted graphical representations, to cause internal communications data 240 to be transferred to external system 270 via execution module 230 and/or to cause external communications data 260 to be transferred to communications system datastore 250, again through execution module 230. System 200 may be configured to make any or all such transfers of data in real time or, alternatively, may be configured to store instructions that will cause such transfers to take place at a later time.

In some embodiments, the synchronization system may be configured to allow a user to create a data synchronization workflow by setting properties and attributes of an abstracted representation of one or more parts of the system as well as setting up abstractions of operative connections between one or more such parts. These settings, properties, connections, attributes, and/or other information may be encapsulated into metadata 220 and may be sent to an execution module 230 that may be configured to perform execution of one or more parts of the dataflow process.

As another example, in some embodiments, the system may be configured to auto-generate icons upon the occurrence of particular events, such as the receipt of a telephone call. For example, upon receipt of a telephone call, an icon representative of that call may be automatically created with any/all information or other communications data about the call that is available, such as the telephone number of the caller. This icon may then be manipulated with other icons and/or actions to control the flow of such data. For example, the icon representative of the call may be dragged to another icon representative of a particular campaign/project to add all available, or a desired subset of the available, communications data for that call. In some embodiments, additional data may automatically be added to the datafile associated with the icon as it becomes available, such as when it is entered into the system by an agent. Alternatively, such additional data may generate additional icons and a user may decide whether and how to add such data to the datafile and/or other campaigns, projects, etc., based upon additional manipulations of such icon(s).

Similarly, in some embodiments, every time an outbound call is made by an agent or other user, an icon or other graphical representation may be automatically created on the user interface. Again, this graphical representation may be associated with a datafile containing one or more pieces of available communications data, such as the telephone number that has been dialed. Other information may be included if available, such as other contact information, a perceived value, level, etc., of the contact, and the like. An administrator of the system may manipulate that icon by, for example, connecting an arrow from the icon to an external system, such as an external CRM system, to indicate that all communications data from the outgoing call should be automatically synched with the CRM system.

In some embodiments, execution module 230 may be configured to execute actual synchronization of data between one or more external systems 270 and the communications system datastore 250 based upon the instructions contained in the metadata 220. As mentioned above, the system may be configured to create the set of instructions contained in the metadata 220 using user interface abstractions 210, which may be configured to allow a user to create a data flow synchronization workflow instruction set by providing an intuitive graphical user interface containing icons or other graphical representations that can be dragged and dropped, stretched, connected with flow process lines, or otherwise manipulated in order to abstract the instruction set and make the process for creating the instruction set intuitive and user-friendly.

The instructions contained in the metadata 220 may also contain directions for communicating between an internal and an external system, communicating between two external systems, performing actions upon the internal communications system, and/or performing other tasks that could logically be performed upon the systems to which the execution module 230 is operatively connected.

Figure 3:
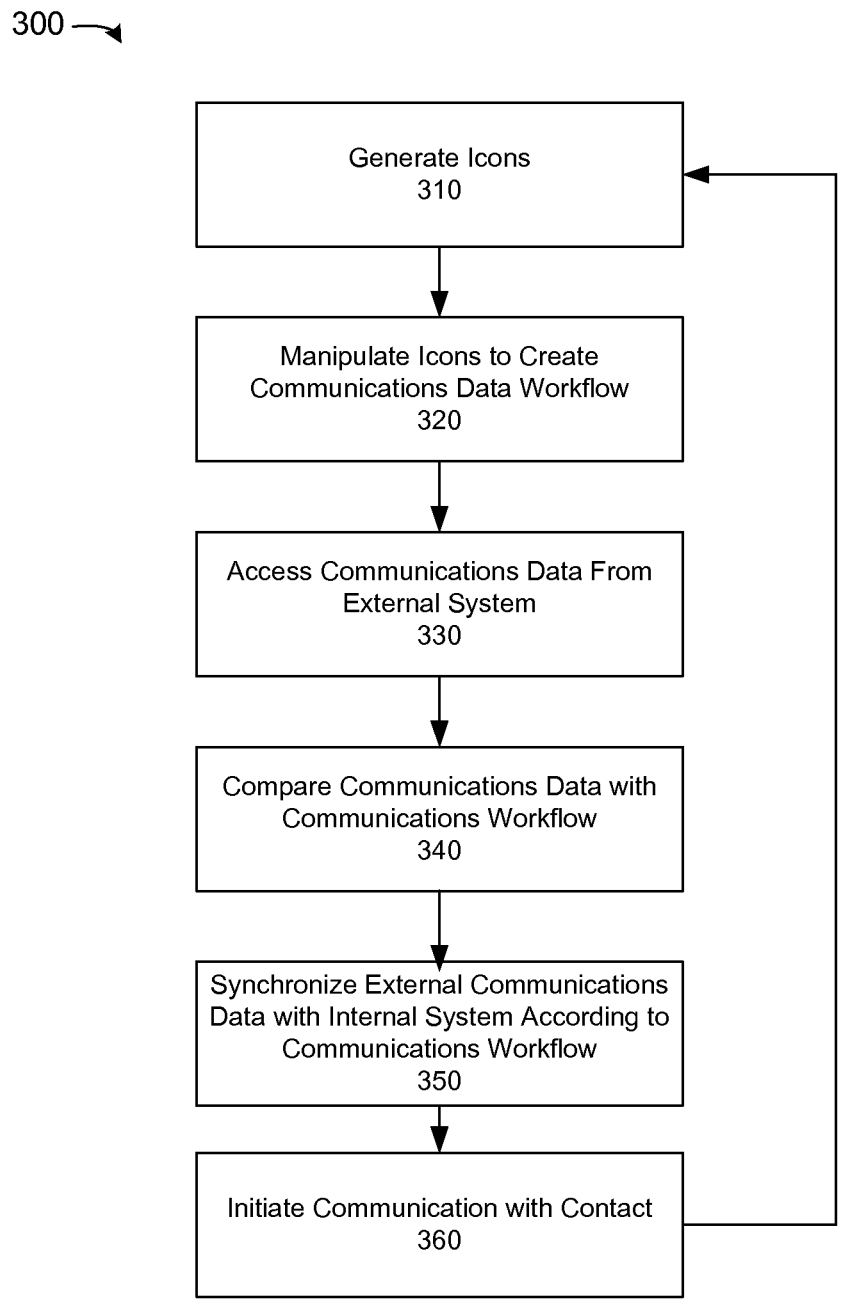
FIG. 3 is a flow chart depicting an example of a method for synchronization of communications data according to one implementation.

FIG. 3 is a flow chart depicting an example of a method 300 according to one implementation of the invention. Method 300 begins at step 310, at which point one or more icons or other graphical representations may be generated. In some implementations, step 310 may comprise using an abstracted graphical user interface to generate one or more icons. In some implementations, step 310 may comprise laying one or more icons onto a graphical user interface for generating an abstracted workflow process. In some embodiments, step 310 may be performed automatically at certain points during operation of an internal communication system. For example, in some implementations, initiating a call and/or receiving a call may automatically generate an icon associated with such a call. In some implementations, step 310 may be performed using, for example, user interface abstraction 210 of system 200.

Method 300 may then proceed to step 320 at which the icon(s) may be manipulated to create a desired communications data workflow. Such a workflow, as discussed above, may comprise a workflow that allows for synchronization of contact information and/or other communications data between an internal database/system and an external database/system. In some implementations, step 320 may comprise dragging, dropping, and/or connecting one or more icons or other graphical representations associated with a particular action set with one or more other icons or other graphical representations associated with a particular set of communications data, such as, for example, an icon associated with a particular call/contact, or group of contacts.

Thus, to provide a more specific example, step 320 may comprise dragging an icon representative of communications data comprising contact information that is perceived as having a high value onto another icon representative of a project, contact value level, and/or workgroup. This action may result in synchronization of such contact information with the particular project or workgroup, or, in the case of a value level, may be used to flag the contact information as having a high value.

In some implementations, steps 310 and/or 320 may be performed by an administrator of an internal communications system, such as a call center communications system, using an abstracted graphical user interface, such as user interface abstraction 210. However, other implementations are contemplated in which steps 310 and/or 320 may also, or alternatively, be performed by an agent. Also, as mentioned above, in some implementations, step 310 may be performed automatically by an internal system without specific user intervention upon certain conditions, such as the receipt of an incoming call and/or the initiation of an outbound call.

Method 300 may then proceed to step 330, at which point communications data from an external system, such as a CRM system or lead generation system, may be accessed. Communications between an internal system and an external system may be facilitated by providing instructions, which may be contained in metadata, such as metadata 220 in system 200. Execution of the instructions in such metadata for accessing/communication with an external system, and/or execution of one or more steps in the workflow generating in steps 310 and 320, may be performed by execution module 230 in some implementations.

At step 340, communications data may be compared with the communications workflow that has been generated. In some implementations, step 340 may comprise comparing one or more labels, flags, notes, or other metadata associated with the communications data with instructions from the generated workflow. As mentioned above, such instructions may be contained in metadata 220 and executed by execution module 230.

To provide a more specific example, in some implementations, step 340 may comprise assessing metadata associated with contact information that relates to the perceived value of the contact(s) associated with the contact information. If the workflow has been generated to indicate that only contacts with a threshold level of perceived value are to be synchronized with a particular group, project, or campaign of an external system, then step 340 may comprise assessing whether the communications data meets such a threshold.

The synchronization according to the communications data workflow may then take place at step 350. Thus, to return to the example just used, if the perceived value of the contact information meets the threshold according to the comparison in step 340, then step 350 may comprise using execution module 230 to execute instructions in metadata 220 that access an external system, such as external system 270, and apply the contact information to the particular group/project/campaign. In some embodiments, data from external system 270 may also be received with an internal communications system datastore 250 and stored to provide a two-way synchronization of communications data.

In alternative implementations, step 340 may be bypassed such that data synchronization is automated between the two systems. For example, as discussed below, in some embodiments and implementations, data records from the external system may be "checked out" by the internal system updated with information from a communication session, and checked back in such that both systems always have access to the updated information. In this manner, managers may be able to obtain a real-time view of customer contact status. Thus, rather than working in large list batches that may become outdated agent shifts, certain embodiments of the inventions disclosed herein may allow managers the speed and flexibility to make list changes on the fly and/or to prioritize contacts and preferred actions without concern that the recommended actions are based upon outdated information.

Some embodiments and implementations may be configured to disable access to a data record by the external system during a checked out period. Alternatively, both systems may have access simultaneously. In some such embodiments, a compare step may be performed after the data record has been checked in to compile information from both systems and, where needed, eliminate or combine information in the record based upon the timing of the data record updates.

At step 360, a communication may be initiated with a contact, such as a customer or potential customer. In some implementations, step 360 may comprise receiving an incoming telephone call. In some implementations, step 360 may alternatively, or additionally, comprise initiating an outbound telephone call. In some implementations, step 360 may automatically result in the generation of an icon or other graphical representation that represents the call or other communication, as indicated in FIG. 3. Along with the generation of such an icon, any available data regarding the communication may be stored in a datafile associated with the icon.

In some embodiments and implementations, a "scoring" system may be implemented that may be used to dictate or at least affect data synchronization and/or prioritization of business contacts. For example, in some embodiments and implementations, contacts who have visited a particular website most recently and/or most often may be placed with a higher "score." Similarly, recent purchases, a threshold number of purchases, and/or a threshold amount of purchases (in some cases within a particular time frame) may be used to further impact the score associated with a particular contact. As further examples of criteria that may impact such scoring, subjective criteria (such as an agent's perception of a contact's receptiveness to a pitch), a connection with another valuable lead/contact, or other actions by the contact—such as time spent on a website, number of clicks or other interactions with a website, purchases of particular products indicated as pertinent to a particular campaign/project, etc.

This scoring system may be configurable by, for example, a manager of a call center such that each agent in a particular campaign, or each agent at the call center, is able to sort their contacts by score to ensure that the higher scoring records are contacted first. In some embodiments, the system may be configured to automatically sort the records in an agent's list/interface in accordance with their score.

In some embodiments, a user interface, such as user interface abstraction 210, may be used to create rules for such a scoring system. In some such embodiments, such rules may be created by manipulating icons within the user interface. For example, in some embodiments, an icon associated with a contact or group of contacts may be dragged onto or connected with other icons associated with a rule, priority level, fact, and/or action. For example, a set of icons may be presented that corresponds to a series of hierarchical priority levels. Those priority levels may be associated with particular facts or data, such as proximity of website interaction, sale, etc. In some embodiments, another icon or set of icons may be presented that modify a threshold or thresholds associated with a fact icon.

One or more such icons may be dragged or otherwise connected to set up a set of rules that may be used to create a score for a contact or group of contacts. Such score(s) may then be used to dictate or suggest particular actions by an agent. In some embodiments, such a score may be used to automatically generate a prioritized call list for an agent. In some embodiments, such a score may be used to automatically synchronize data in a pre-specified manner. For example, the scores may be arranged to automatically synchronize a subset of contacts meeting a certain threshold score or within a certain range of scores with a particular group of contacts, such as a particular project or campaign. Similarly, other contacts may be automatically synchronized with other contact group/project/campaign according to their respective scores.

It should also be understood that any of the methods and/or systems described above may be implemented by providing for real-time, or near real-time, communication of information or, alternatively, by transferring blocks of information periodically. For example, in embodiments comprising data synchronization, such synchronization may be configured to take place in real-time, or near real-time, as contacts are received and/or updated. Alternatively, such contact data/updates may be stored in local memory and synchronized on a specified schedule, such as nightly. In some embodiments, particular types of information, such as information designated as having a high value, may be synchronized in real time and other data deemed less important may be synchronized periodically.

In some embodiments, one or more records or sets of records may be scheduled for delivery from the CRM/data management system to the call center/communications management system at particular times and/or time intervals. Additionally, some embodiments may allow for automatic recall of certain records prior to delivery based upon certain criteria. For example, prior to delivery or checking out of records from the CRM, a check may be made to determine whether each of the records have been subject to a recent communication or communication attempt and may be recalled upon making such a determination.

Figure 4:
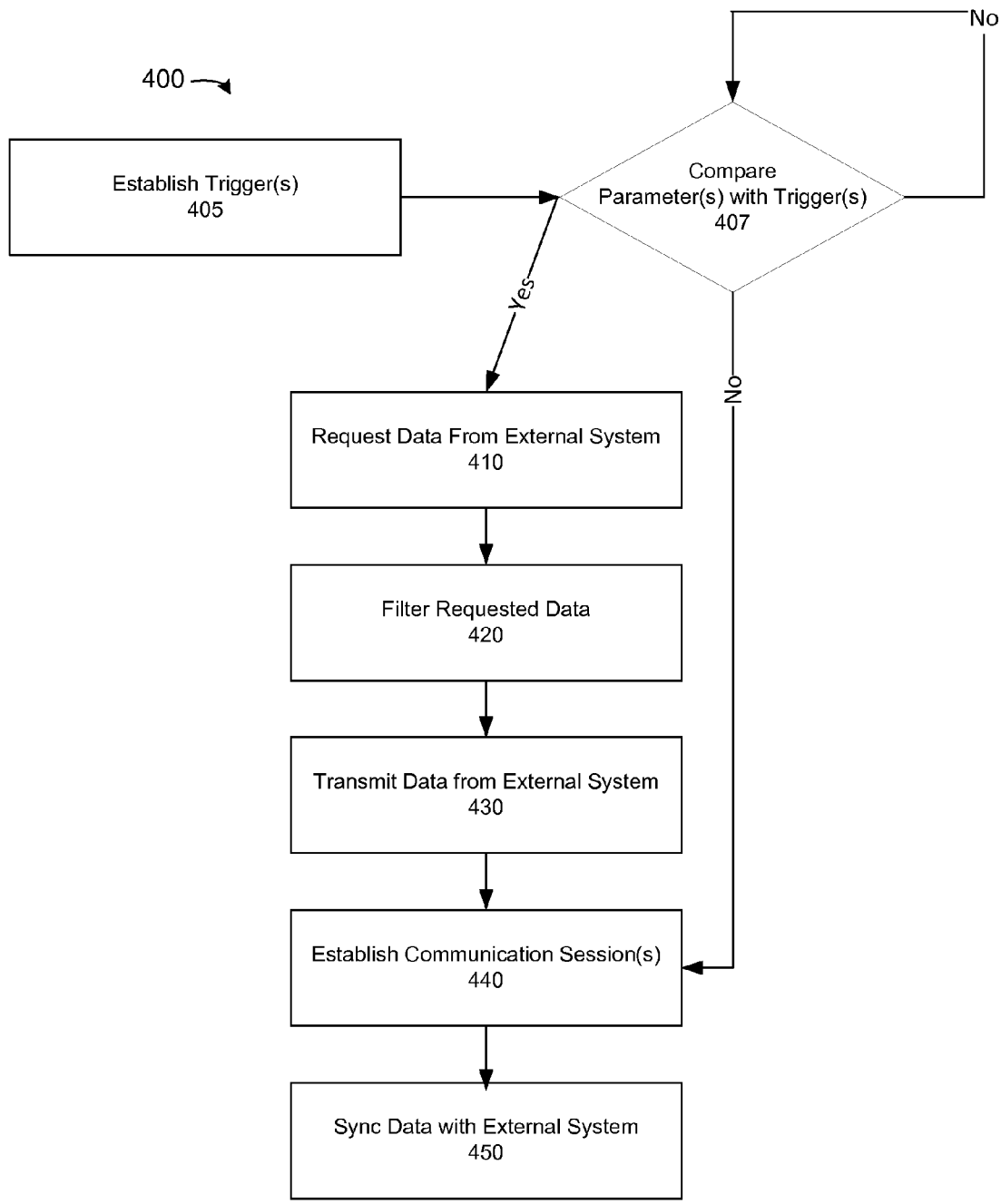
FIG. 4 is a flow chart depicting another example of a method for synchronization of communications and/or contact data according to another implementation.

FIG. 4 is a flow chart depicting an example of a method 400 according to another implementation of the invention. In some implementations, method 400 may begin at step 410, at which point a communications management system, such as a call management system used by a call center, for example, requests data from another disparate data management system external to the communications management system, such as a CRM. In some implementations, the communications management system may be run by a first party and the data management system may be run by a second party distinct from the first party.

In some implementations, step 410 may comprise, for example, requesting contact data records (or receiving such a request), which may comprise a list of data records for customers or potential customers to be contacted by agents in a call center. In some implementations and embodiments, step 410 may be performed by the communications management system in response to one or more triggers. Thus, method 400 may, in certain implementations, comprise a preliminary step 405 of establishing triggers for updating of a set of contact records, such as for automatically requesting contact data from a customer relationship management system to update a communications management system, such as a call center dialer system.

For example, in some embodiments and implementations, one or more triggers may be established at step 405 that comprise thresholds. Such threshold(s) may comprise, for example, a low threshold of contacts. Thus, in some implementations, another preliminary step 407 may comprise comparing a parameter of a set of contact records with one or more triggers. For example, in some such implementations, step 407 may comprise comparing a number of contacts in a particular set or subset of contact records with one or more thresholds. If the comparison of step 407 is met, then method 400 may proceed to step 410. If the comparison of step 407 is not met, then method 400 may, in some implementations, repeat step 407 in a loop. Alternatively, method 400 may, upon determining that the comparison of step 407 has not been met, proceed to one or more other steps in the process, such as step 440.

In some embodiments and implementations, a threshold may be established of available contacts. In other words, this threshold may be with respect to all contacts in the call center system or other communications management system from the CRM or other data management system. Alternatively, or additionally, a threshold may be established for "ready" contacts. This threshold may take into consideration time information such as the current time, day of week, date, and/or other criteria of the contact records and may request new contact records that are ready for being contacted at the current time, or within a pre-specified time window. In some embodiments and implementations, step 410 may be performed automatically by the system as soon as one or more thresholds have been reached. Alternatively, or additionally, the system may be configured to allow a user to manually request new contacts (available and/or ready). Some embodiments and implementations may also, or alternatively, be configured to allow a user to specify the number of new records to pull/request upon receipt of a manual or automated trigger signal. In such embodiments, by limiting the number of records requested/pulled, the freshness of the contacts may be maintained to a desired level based upon the number requested with each update. Similarly, by allowing a user to adjust the thresholds that may trigger a request, a user may be able to fine tune the "freshness" (or lack thereof) of a set of contacts/leads used by a call center dialer/system.

In some embodiments and implementations, the contact records being requested from the data management system/CRM may be filtered before being pulled/sent to the communications management system/call center software. In other words, certain records may be rejected before being sent to the data management system/CRM, which may result from, for example, incomplete records, low score, indication of termination and/or completion of a particular goal or project, a threshold number of unsuccessful attempts, etc. Thus, some implementations of method 400 may comprise filtering 420 the requested contact records. In some such implementations, step 420 may comprise filtering the requested records based upon pre-specified criteria.

For example, in some implementations, step 420 may comprise filtering a set of contact records to obtain a set of contact records that are currently available for being contacted, or are available for being contacted within a certain proximal time window. Thus, only contacts that are indicated as being available, or likely available, in the next two hours, for example, may pass through the filter and be available for transmission/updating/use.

Other filtering steps may take place at other points during the process if desired. For example, in some embodiments and implementations, a workflow may be created that allows a user to prevent a communication from taking place if a particular time window has passed. For example, some users may wish to allow customers to request being contacted within the next hour, and may wish to configure the system to prevent such communications from taking place after that one hour time window has expired. Thus, in some implementations, prior to establishing communication with a contact (see step 440 below), a filter may be applied to determine whether the time window has expired. If so, the system may prevent the communication from taking place. In some such embodiments and implementations, the system may pull the data record and/or check it in with the CRM to prevent the communication from happening.

The records (in implementations comprising step 420, filtered records) may then be sent to the communications management system at step 430. In some implementations, step 430 may comprise "checking out" or obtaining access to each of the records being sent to the communications management system. Thus, some implementations may be configured to prevent access to the current list of records by the CRM while checked out to the communications management system. Alternatively, step 430 may comprise simply making a copy of the records such that the CRM may continue to have access to the records while they are made available to the communications management system. In some such implementations, the records may be later synchronized to account for updates from the CRM and/or the communications management system.

After receiving the records at step 430, the communications management system may be used to establish or facilitate communication sessions with one or more of the contact records at step 440. For example, in some implementations, a call center dialer system may be used to dial telephone calls to one or more of the contacts of the new set of records received at step 430. In some implementations, step 430 may be driven by a workflow created by other embodiments of the invention, such as by workflow creation user interface 130 of data synchronization system 100.

As previously mentioned, in some implementations, a pre-communication step may take place before initiating a communication. For example, in some embodiments and implementations, the system may be configured to conduct a check after receiving a request to initiate a communication but immediately before establishing such communication. This check may look for data from the CRM that might suggest that the communication should not take place. For example, in some implementations, a scripted workflow may be generated that applies a time window for making the communication and prevents communications from actually being initiated outside of this time window. The check may therefore look for an indication of such a time window, assess the current time, and either allow or prevent the communication depending upon the results of the check.

Following the communication session of step 440 or, in some implementations, wholly or partially during this communication session, data from the communication session may be used to update a data record associated with the communication session. For example, in some implementations, communications data, such as the date and time of the communication, the method of communication, a score associated with the contact and/or communication, such as the number, times, and/or methods by which a contact has been contacted, and the like. Some or all of the data used to update the record may be automatically generated by the system. Some or all of the data may be input by a user/agent.

After the data record has been updated, the data may be synched at step 450 with the data management system (such as a CRM operated by a third party) external to the communications management system. In some implementations, this step may comprise "checking in" a data record checked out or otherwise obtained from the external data management system. Alternatively, step 450 may comprise otherwise transmitting updated data from a communications management system, such as a call center system or "dialer," to an external data management system, such as a CRM, that is reflective of one or more communication sessions managed by the communications management system so as to update one or more records of the data management system.

In some implementations, the system may be configured to return control or "check in" a data record with the CRM/data management system after synchronization. In some such implementations, however, a workflow may be generated that allows for scripting multiple communications with a particular data record/contact. For example, in some implementations, the workflow may dictate that, after an initial communication (in some cases, an unsuccessful communication attempt, for example), subsequent actions for attempting further communications may be dictated. For example, after making a phone call to a contact pulled from the external system, the communications system may retain the record for that contact to attempt additional retries based on pre-defined settings/criteria. Thus, some data records may be tagged with settings that mandate another attempt within a predefined time frame, or that prohibit another attempt before a predefined time frame has expired. Similarly, some data records may be tagged with information about preferred subsequent communication means. For example, some data records may be tagged such that after a first attempt by telephone, subsequent communication attempts should be made by email, or vice versa. Other implementations and embodiments may be configured such that the workflow generated at the communications system applies the same retry settings to each contact record pulled from the CRM, or to a subset of such records based upon other criteria, such as within a predefined group or project, for example.

In some embodiments and implementations, a user at the call center/communications management system may be able to query the external data management system/CRM for details on how and/or when the next communication is to take place without returning control, or "checking in," the record to the external system. Thus, for example, after a first phone call in a script, the user may consult the external system to find that the next interaction with the contact should be a text message to be delivered at a specified time. In some such embodiments and implementations, this information may override the retry logic of the internal communications management system such that the CRM may be used to dictate the retry parameters.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment. It will be apparent to those having skill in the art that changes may be made to the details of the above-described embodiments without departing from the underlying principles set forth herein.

Furthermore, the described features, operations, or characteristics may be combined in any suitable manner in one or more embodiments. It will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require a particular order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a machine-readable storage medium having stored instructions thereon that may be used to program a computer (or other electronic device) to perform processes described herein. The machine-readable storage medium may include, but is not limited to: hard drives, floppy diskettes, optical disks, CD-ROMs, DVD-ROMs, ROMs, RAMs, EPROMs, EEPROMs, magnetic or optical cards, solid-state memory devices, or other types of medium/machine-readable medium suitable for storing electronic instructions.

As used herein, a "module" or component may comprise any type of computer instruction or computer executable code located within a memory device and/or m-readable storage medium. A software module may, for instance, comprise one or more physical or logical blocks of computer instructions, which may be organized as a routine, program, object, component, data structure, etc., that perform one or more tasks or implements particular abstract data types.

In certain embodiments, a particular software module may comprise disparate instructions stored in different locations of a memory device, which together implement the described functionality of the module. Indeed, a module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, a required, or an essential feature or element. The scope of the present invention should, therefore, be determined only by the following claims.

The invention claimed is:

1. A method for synchronizing data between a communications management system and an external customer relationship management system, the method comprising the steps of:
   requesting contact data from the customer relationship management system;
   filtering the contact data by the time window in which customers associated with the contact data are available to be contacted to obtain a filtered set of contact data;
   receiving the filtered set of contact data at a communications management system, wherein the communications management system is external to the customer relationship management system, and wherein the communications management system is operated by an entity distinct from an entity operating the customer relationship management system;
   scoring contact data, and sorting communications such that communications using contact data having higher scores occur earlier than contacts with lower scores;
   if the time window has not expired, using the communications management system to establish a communication using at least one contact from the filtered set of contact data; and
   synchronizing, during the communication in real time, contact data between the communications management system and the customer relationship management system using data generated during the communication, by transmitting contact data to the customer relationship management system.

2. The method of claim 1, wherein the communications management system comprises a call center dialer system.

3. The method of claim 2, wherein the step of using the communications management system to establish a communication comprises using the call center dialer system to dial a telephone call to at least one contact from the filtered set of contact data.

4. The method of claim 1, further comprising establishing one or more triggers for automatically requesting contact data from the customer relationship management system.

5. The method of claim 4, wherein the one or more triggers comprise at least one threshold.

6. The method of claim 5, wherein the at least one threshold comprises a lower threshold of currently available contact records.

7. The method of claim 4, further comprising comparing a parameter of a set of contact records with the one or more triggers.

8. The method of claim 7, wherein the step of comparing a parameter of a set of contact records with the one or more triggers comprises comparing a number of contacts in a set of contact records at the communications management system with a threshold number of contact records.

9. The method of claim 8, wherein the threshold number of contact records comprises a lower threshold of currently available contact records.

10. The method of claim 1, further comprising:
    creating a data synchronization and communication workflow using a workflow creation user interface;
    using the data synchronization and communication workflow to manage one or more communication sessions with one or more contacts from the filtered set of contact data; and
    using the data synchronization and communication workflow to manage synchronization of data between the communications management system and the customer relationship management system.

11. A method for synchronizing data between a communications management system and data management system, the method comprising the steps of:
    requesting contact data from the data management system; filtering the contact data by the time window in which customers are available to be contacted to obtain a filtered set of contact data;
    receiving requested contact data at a communications management system, wherein the communications management system is external to the data management system, and wherein the step of receiving requested contact data at the communications management system comprises receiving the filtered set of contact data from the data management system;
    scoring contact data, and sorting communications such that communications with customers associated with contact data having higher scores occur earlier than communications with customers associated with contact data with lower scores;
    if the time window has not expired, using the communications management system to establish a communication using at least one contact from the requested contact data;
    updating the requested contact data, during the communication in real time, using data generated during the communication; and
    transmitting updated contact data to the data management system.

12. The method of claim 11, wherein the communications management system is operated by an entity distinct from an entity operating the data management system.

13. The method of claim 11, wherein the data management system comprises a customer relationship management system.

14. The method of claim 11, wherein the communication comprises an outbound communication.

15. A communications management and data synchronization system for managing communications and synchronizing communications data between a communications management system and an external customer relationship management system, the system comprising:
    a workflow creation user interface executed on computer hardware components to allow a user to customize a workflow associated with communications between one or more agents and one or more contacts, wherein the workflow creation user interface is further configured to allow a user to control the flow of communications data comprising data associated with communication between one or more agents and one or more contacts, wherein the workflow creation user interface is further configured to prevent communications between agents and contacts from taking place after a time window in which customers are available to be contacted has expired, and to sort communications such that communications with contacts having higher scores occur earlier than contacts with lower scores;
    a communications system datastore executed on computer hardware components to store internal communications data comprising data associated with communication between one or more agents and one or more contacts generated by the communications management and data synchronization system; and
    a computer execution module executed on computer hardware components to receive external communications data from a customer relationship management system external to the communications management and data synchronization system, wherein the execution module is further configured to receive internal communications data from a communications system datastore, wherein the execution module is further configured to synchronize communications data, during the relevant communication in real time, between the communications management and data synchronization system and the external customer relationship management system, by transmitting data to the external customer relationship management system, and wherein the execution module is configured to access contact data from the customer relationship management system and filter the contact data by the time window in which contacts are available to be contacted to obtain a filtered set of contact data according to a set of pre-specified criteria.

16. The communications management and data synchronization system of claim 15, wherein the execution module is further configured to execute synchronization of communications data between the communications management and data synchronization system and the external customer relationship management system based upon instructions contained in metadata.

17. The communications management and data synchronization system of claim 16, wherein the workflow creation user interface is further configured to use user interface abstractions comprising graphical representations to create a synchronization workflow instruction set and encapsulate the synchronization workflow instruction set in the metadata.

18. The communications management and data synchronization system of claim 17, wherein the workflow creation user interface is further configured to allow the graphical representations to be at least one of dragged and dropped, stretched, and connected with flow process lines to abstract the synchronization workflow instruction set.

19. The communications management and data synchronization system of claim 15, wherein the communications data comprises data automatically generated by the communications management and data synchronization system during communications with contacts.

20. The communications management and data synchronization system of claim 15, wherein the communications data comprises data manually entered by an agent of the communications management and data synchronization system.

* * * * *